(12) United States Patent
Novaes

(10) Patent No.: US 7,103,054 B2
(45) Date of Patent: Sep. 5, 2006

(54) METHODS AND ARRANGEMENTS FOR BUILDING A SUBSOURCE ADDRESS MULTICAST DISTRIBUTION TREE USING POINT TO POINT ROUTING RECORDS

(75) Inventor: Marcos N. Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 09/906,937

(22) Filed: Jul. 16, 2001

(65) Prior Publication Data

US 2003/0012206 A1     Jan. 16, 2003

(51) Int. Cl.
H04L 12/28       (2006.01)
H04L 12/56       (2006.01)
H04J 3/26        (2006.01)
H04J 1/16        (2006.01)

(52) U.S. Cl. ............... 370/401; 370/390; 370/432; 709/238; 709/245

(58) Field of Classification Search ............... 370/256, 370/390, 400, 401, 408, 432, 395.31, 231, 370/351, 360, 389, 396, 471; 709/238, 245
See application file for complete search history.

(56) References Cited

U.S. PATENT DOCUMENTS

| | | | | |
|---|---|---|---|---|
| 4,864,559 A | * | 9/1989 | Perlman | 370/256 |
| 4,999,833 A | * | 3/1991 | Lee | 370/312 |
| 5,355,371 A | * | 10/1994 | Auerbach et al. | 370/255 |
| 5,784,557 A | * | 7/1998 | Oprescu | 709/220 |
| 5,831,975 A | * | 11/1998 | Chen et al. | 370/256 |
| 6,330,229 B1 | * | 12/2001 | Jain et al. | 370/256 |
| 6,526,054 B1 | * | 2/2003 | Li et al. | 370/390 |
| 6,529,498 B1 | * | 3/2003 | Cheng | 370/351 |
| 6,584,075 B1 | * | 6/2003 | Gupta et al. | 370/256 |
| 6,611,528 B1 | * | 8/2003 | Farinacci et al. | 370/432 |
| 6,621,798 B1 | * | 9/2003 | Krishnan et al. | 370/256 |
| 6,693,907 B1 | * | 2/2004 | Wesley et al. | 370/390 |
| 6,697,365 B1 | * | 2/2004 | Messenger | 370/390 |
| 6,707,796 B1 | * | 3/2004 | Li | 370/254 |
| 6,763,007 B1 | * | 7/2004 | La Porta et al. | 370/331 |
| 6,778,532 B1 | * | 8/2004 | Akahane et al. | 370/392 |
| 6,862,279 B1 | * | 3/2005 | Imai et al. | 370/390 |
| 2002/0012327 A1 | * | 1/2002 | Okada | 370/328 |
| 2004/0213233 A1 | * | 10/2004 | Hong et al. | 370/392 |

\* cited by examiner

Primary Examiner—Chirag Shah
(74) Attorney, Agent, or Firm—Ference & Associates

(57) ABSTRACT

Methods and arrangements for facilitating multicast communication among at least two nodes in a distributed network configured for point to point communications. Each router node is provided with a first switching arrangement adapted to route a message between a publisher node and a subscriber node in accordance with a first protocol, and a second switching arrangement adapted to route a message between the publisher node and the subscriber node in accordance with a second protocol.

17 Claims, 10 Drawing Sheets

METHODS AND ARRANGEMENTS FOR BUILDING A SUBSOURCE ADDRESS MULTICAST DISTRIBUTION TREE USING POINT TO POINT ROUTING RECORDS

FIELD OF THE INVENTION

The present invention relates generally to the field of digital communications, and more particularly to packet transmission systems involved in the management of multicast communications to a plurality of users.

BACKGROUND OF THE INVENTION

In the field of communication networks, the term multicast refers to a data package switching technology in which a single data packet is received by a plurality of nodes. This mode of transmission is especially useful when several nodes in the network need to receive data packets which emanate from the same source. The multicast technology reduces the number of separate transmissions and data switching operations which are necessary to deliver a data package to a set of nodes in a communications network. The communications network contains specialized nodes which are called router nodes, or package switching nodes. Such nodes perform the package switching operation which route a given data package along the network towards a specific destination.

The multicast capability of a network is an extension of the point to point transmission infrastructure of the communications network. There are known to exist a number of network communication standards, the most prominent being the Internet Protocol (IP). Other protocols exist which are distinct to IP, such as Asynchronous Transfer Mode (ATM), or are an extension of the IP protocol. Similarly, several multicast protocols exist which implement the multicast capability which are designed for the several point to point transmission mode protocols. The most prominent of such multicast protocols are the implementations of multicast, which are integrated with the basic IP protocol. Some of these implementations have become standards, such as DVMRP and PIM, and yet others remain under discussion, such as MOSPF. (These are all currently existing multicast technologies, as defined by the IETF [Internet Engineering Task Force]. As DVMRP [Distance Vector Multicast routing Protocol] and PIM [Protocol Independent Multicast] are now standard, they are published as Internet Drafts by the IETF. As MOSPF [Multicast Open Shortest Path First Protocol] is still under discussion at the IETF, it is published as an RFC document [i.e., "Request for Comments"]. The references for these protocols are as follows: DVMRP-IETF Internet Draft; MOSPF-IETF RFC 1584; and PIM-IETF Internet Draft.)

Generally, it can be said that all the currently existing multicast protocols have one characteristic in common, which is the fact that they utilize the same addressing scheme as the underlying point to point protocol. This fact limits the addressing capability of the multicast protocol to that of the underlying point to point protocol. For example, this characteristic makes the protocols in question unsuitable in a scenario in which a data source needs to send a data package to a subset of all of its receivers. Since the number of all possible subsets of receivers of data from a given source grows exponentially with the number of receivers, conventional multicast technology tends to be inadequate for a variety of applications requiring a finer addressing capability.

Apart from the fact that each conventional multicast protocol is usually designed as an extension of the underlying point to point protocol, another important aspect of the design of existing multicast technology is that of the design and maintenance of the multicast distribution trees. A multicast distribution tree is a distributed data structure which includes a number of router nodes, a number of source nodes and a number of receiver nodes. Typically, multicast distribution trees are derived from the actual configuration of the routers of the underlying protocol. In most such protocols, two nodes in the distribution tree are only "neighbors" if they are physically connected by a communications link. In some implementations, a facility exits which allows for a human operator to create links in a multicast distribution tree between two nodes which are not physical neighbors. Such links are called multicast tunnels. The utilization of multicast tunnels has become a necessity in several applications in which users are interconnected by a communications network which does not support any form of multicast protocol. This problem is particularly serious at present, because the most widely utilized communication network is the universal Internet, which was originally derived form the DoD (Department of Defense) ARPAnet and now is the most widely used private network, which spans the entire planet and has a number of users approaching one billion.

The Internet presently only supports the IP point-to-point protocol. The Internet has been unable to support the IP multicast standard because of the sheer size of the Internet. In such a scenario, it becomes very hard to deploy a protocol which builds distribution trees efficiently. Even if this problem could be solved in the near future, another problem, the coarseness of the IP multicast addressing scheme, will still be a limitation of the multicast capability. In case the nodes in the interconnecting network do not support a protocol of choice, it will most likely be necessary to utilize protocol tunnels. The manual configuration, i.e., the construction of multicast distribution trees by human operators, becomes impractical in Internet applications.

In view of the foregoing, several needs have been recognized, among which is a need to provide multicast distribution tree technology configured for efficiently and automatically constructing a multicast distribution tree for nodes which are separated by a network which does not support the specific multicast protocol.

SUMMARY OF THE INVENTION

In accordance with at least one presently preferred embodiment of the present invention, the problem of distributing data packages to a refined set of subscriber nodes is solved by the provision of a method for organizing a network of router nodes into a distribution structure which is termed a Subsource Addressing Multicast Tree. This method is utilized to extend the addressing capabilities of a point to point network, adding to the network the capability to multicast data packages. The method involves the utilization of routing tables of a point to point protocol in order to construct Subsource Addressing Multicast data distribution trees.

In summary, the present invention provides, in one aspect, a method of facilitating multicast communication among at least two nodes in a distributed network configured for point to point communications, the method comprising the steps of: designating one of the nodes as a publisher node; designating at least one of the nodes as a subscriber node; and designating at least one of the nodes as a router node; providing each router node with a first switching arrangement, the first switching arrangement being adapted to route a message between the publisher node and the subscriber node in accordance with a first protocol; and providing each router node with a second switching arrangement, the second switching arrangement being adapted to route a message between the publisher node and the subscriber node in accordance with a second protocol.

In another aspect, the present invention provides an apparatus for facilitating multicast communication among at least two nodes in a distributed network, the apparatus comprising: an arrangement for designating one of the nodes as a publisher node; an arrangement for designating at least one of the nodes as a subscriber node; and at least one router node, wherein each router node comprises: a first switching arrangement being adapted to route a message between the publisher node and the subscriber node in accordance with a first protocol; and a second switching arrangement being adapted to route a message between the publisher node and the subscriber node in accordance with a second protocol.

Furthermore, in an additional aspect, the present invention provides a program storage device readable by machine, tangibly embodying a program of instructions executable by the machine to perform method steps for facilitating multicast communication among at least two nodes in a distributed network, the method comprising the steps of, designating one of the nodes as a publisher node; designating at least one of the nodes as a subscriber node; and designating at least one of the nodes as a router node; providing each router node with a first switching arrangement, the first switching arrangement being adapted to route a message between the publisher node and the subscriber node in accordance with a first protocol; and providing each router node with a second switching arrangement, the second switching arrangement being adapted to route a message between the publisher node and the subscriber node in accordance with a second protocol.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
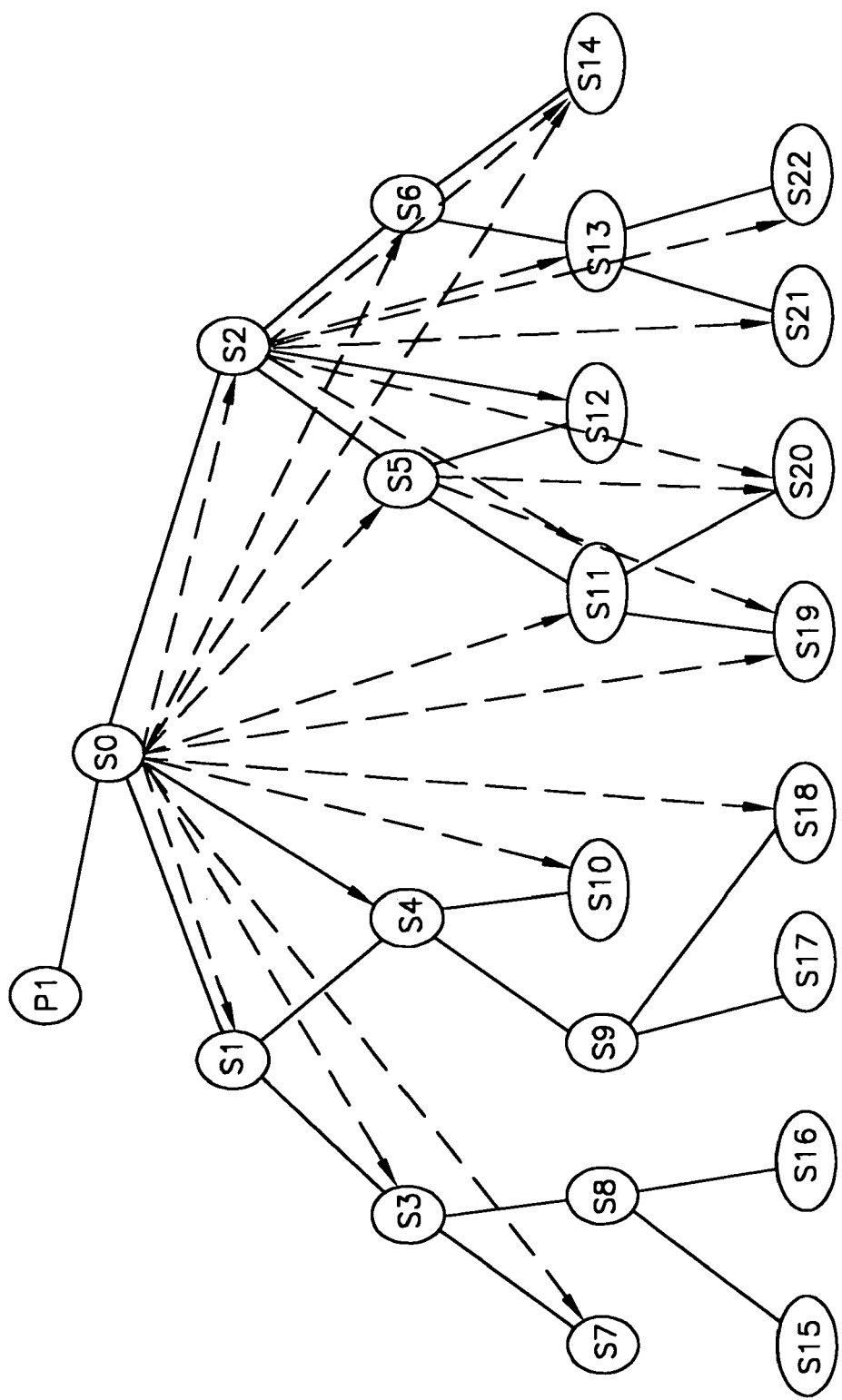
FIG. 1 schematically illustrates a distribution tree and some possible paths for data propagation.

Several other copending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the title and application Serial No. for each one): "Methods and Apparatus for the Propagation of Multicast Transmissions In A Communications Network" (application Ser. No. 09/906,928); "Methods and Apparatus for Updating Subsource Addressing Multicast Routing Records in a Communications Network" (application Ser. No. 09/906,597); "Methods and Arrangements for Building a Subsource Address Multicast Distribution Tree Using Traced Routes" (application Ser. No. 09/906,936); "Methods and Arrangements for Building a Subsource Address Multicast Distribution Tree Using Network Bandwidth Estimates" (application Ser. No. 09/906,939); "Methods and Arrangements for Dynamically Modifying Subsource Address Multicast Data Distribution Trees" (application Ser. No. 09/906,596); "Methods and Arrangements for Monitoring Subsource Addressing Multicast Distribution Trees" (application Ser. No. 09/906,593); "Methods and Arrangements for Establishing a Group Collaboration Session Utilizing Multiple Multicast Distribution Trees" (application Ser. No. 09/906,935); and "Methods and Arrangements for Multicasting a Data Stream at Different Data Rates to Groups of Subscribers" (application Ser. No. 09/906,938).

Throughout the present disclosure, various terms are utilized that are generally well-known to those of ordinary skill in the art. However, for the purposes of providing additional clarity, a number of such terms are briefly defined immediately herebelow. (Though one or more of the terms may well be defined elsewhere herein, it is deemed useful at this juncture to gather all of the following terms in one place, to provide a glossary of sorts that may serve, when needed, as a convenient and easily discernible reference point.)

A "data distribution path" is defined as the sequence of routing nodes which a specific message traverses from the moment that it originates in a publisher node to the moment that it arrives in a receiver node.

A "node" is a general vertex in the multicast distribution tree. There are three specific types of nodes in a SAM tree: the publisher node, which is the root of the tree, the intermediate nodes, which are the nodes with child nodes which are not the root node, and the leaf nodes, which are nodes without any children nodes. The term node is used in this embodiment to generally refer to any of type of node in the SAM tree.

As employed herein, the term "package switching operation" is used to refer to the operation performed by intermediate nodes, also called router nodes, in the data distribution path of a given data transmission. This operation involves receiving the data package and then making a decision of where to retransmit it, if necessary. This decision is made utilizing data that is stored in the proximity of the router node, generally referred to as routing tables. After the routing table are consulted, a package switching node will retransmit (switch) a package to either another intermediate router node or the final receiver of the package.

The term "piece wise point to point" is used to describe the way in which the SAM technology exploits the underlying point to point network protocol in multicasting a message to a plurality of receivers. A SAM message originates a the root node and is addressed with the point to point address of either a final receiver node or an intermediate router node. Whenever an intermediate router node receives a SAM message, it will retransmit it to one or more point to point addresses, of either final receivers or intermediate nodes. This operation is repeated until the message finally reaches a final receiver, or leaf node in the SAM tree. Therefore, a single message is transmitted to a variety of receivers utilizing different point to point addresses along the transmission path. It can thus be said that SAM transmissions are always made using the point to point mode of transmission at every step (piece )of the transmission path, and that the transmission pattern is therefore piece wise point to point.

The term "point of divergence" refers to a node in the SAM tree which has more than one descendant node to which it has to route a given message.

The term "point to point" is used to refer to a transmission mode in which a given message is transmitted from a single source (or point) to a single receiver. Typically, communication networks only support point to point protocols, the most prevalently used being the Internet Protocol (IP) and the Asynchronous Transfer Mode (ATM) protocols. Other modes of transmission are possible, such a broadcast and multicast. Such protocol can be implemented extensions of the underlying (basic) point to point protocol.

The term "point to point address" refers to a network address utilized by basic point to point protocol provided by the communications network.

The term "protocol tunneling" refers to a technique which makes possible to transmit a data package encoded by a given protocol in a network which does not offer direct support for the protocol. The technique involves the encapsulation of the data package into a data segment which is addressed utilizing the basic point to point protocol supported by the network. The package is then transmitted from to a node which is able to receive and process it. These two nodes are referred to as the end points of the tunnel. The receiving node is then able decapsulate the original data package and retransmit it further. Eventually, the package arrives at a network which offers native support for the protocol.

A "publisher node" is a node which is a source of a given information. In SAM, messages are multicasted to a plurality of receivers utilizing a distribution tree, named the SAM tree, which is rooted at the publisher node.

The term "predicate" is used to refer to an additional data field used by SAM to extend the addressing capability of an underlying point to point protocol. This field is used by applications to store data which is used to define specific subsets of the information that originates from a publisher node.

The term "router node" is used to refer to a node which retransmits a given data package such that it can reach a specific final destination. The term "package switching node" is synonymous with this term.

"SAM" is an abbreviation for "Subsource Addressing Multicast".

The term "SAM protocol" refers to the collection of methods and operations which are used by source nodes to express interest in the subsets of information published by a given source, and by the source of information to publish message to subsets of subscribers.

The "SAM tree" is a data structure utilized to multicast messages from the node which is the source of the tree. The intermediate nodes (nodes with children) of the SAM tree are nodes which are capable of routing SAM messages any of their descendants. The leaf nodes (nodes without children) are nodes that are final receivers of SAM messages. It is also possible for an intermediate node to be a final receiver of a SAM message.

The term "shared paths" is used in reference to the intersection of transmission path segments for a message addressed to a plurality of subscribers. In this embodiment this term is used in reference to both point to point and multicast routing paths. A point to point shared transmission path between two receivers of a message occurs when the routing decisions taken by the underlying point to point protocol define paths that traverse the same sequence of routing nodes for some portion of the paths. Similarly, a multicast shared path is an equal sequence of multicast routing nodes in the transmission paths for messages destined for multiple multicast addresses. In the field of multicast communications, performance gains are realized by exploiting common transmission paths, or shared paths, in both the point to point and the multicast package switching infrastructure.

The term "subsource addressing multicast" is used to collectively refer to a set of technologies which make possible for a source of information to multicast messages to any given subset of its receivers. This technology includes the SAM protocol and the SAM tree discussed above.

As employed herein, a "subscriber" is a node which has posted at least one subscriber operation, and a final receiver of SAM messages.

The term "tunneling" refers to the act of deploying a protocol tunnel (described above) for the transmission of a message.

The term "underlying protocol" is used to refer to the basic point to point protocol supported by the communications network.

At least one presently preferred embodiment of the present invention broadly embraces a multicast distribution tree capable of realizing multiple distribution paths. The distribution tree may be referred to as a Subsource Addressing Multicast tree, or a SAM tree. As described herebelow, the SAM tree is capable of realizing optimal distribution paths for any subset of the nodes of a given source which is the root of the tree. The tree is preferably configured such that it can be deployed as an extension of any underlying point to point protocol.

In accordance with at least one presently preferred embodiment of the present invention, the SAM multicast distribution tree is distinguished from other distribution trees because any given intermediate node can propagate a message not only to its direct descendants, but also to any number of indirect descendants. Therefore, in addition to keeping the basic state information which is required from a multicast distribution tree, such as parent and direct descendant information, each intermediate node in the tree also keeps data related to the propagation to indirect descendants. In other words, the SAM multicast tree can be used to propagate messages in a plurality of paths. In actuality, the SAM trees allows for the all possible combinations of data transfer paths between the root node of the tree and all possible subsets of its descendants. The SAM tree can therefore be utilized to support a very fine grained addressing scheme, such as the SAM protocol.

FIG. 1 illustrates a SAM tree and a few of the possible paths for data propagation from the node S0, denoted by the dotted arrows. Not all possible paths are shown, so as not to impair the clarity of the illustration. Each parent node is capable of sending a message directly or via a protocol tunnel to any of its descendants. The collection of all possible subpaths generate a distribution mesh capable of efficiently multicasting messages to any subset of receivers making optimum use of the shared transmission paths among receivers.

The data propagation patterns determined by the SAM propagation tree are preferably such that a message destined for multiple nodes will incur a minimum number of retransmissions. In one embodiment, this is achieved by forcing the retransmissions to occur only at the points of divergence in the propagation path. This will result in the optimal utilization of shared paths among the subsets of receivers of the message. The direct transmission of a message from a parent node to its descendants can be made via a protocol tunnel, which will result in further gains in performance.

Preferably, the SAM tree includes a root node P1, which is the publisher of information, and a set of nodes (e.g., S0–S22) which are either direct or indirect descendants of the root node P1. The descendants of the root node P1 can be either the final destination of notification messages or intermediate router nodes. A router node is a node is capable of forwarding notification messages to other router nodes or subscriber nodes. A subscriber node is a node which is a final destination for a notification message. A router node may be a subscriber node as well as a router node.

As previously mentioned, multicast capability is usually added to a network as an extension of some previously existing point to point protocol. Preferably, the SAM tree is configured such that it makes an optimal use of the existing point to point message switching infrastructure. When a parent node in the SAM tree relays a message to one if its descendants utilizing the descendant's point to point address directly, it is avoiding the overhead of making several package switching operation at each intermediate node in the path from the parent to the descendant.

Since SAM extends the addressing capability of the underlying point to point protocol, it involves two kinds of data switching operations:
  i. the basic point to point package switching operation
  ii the extended multicast package switching operation, which is performed by the nodes in the network which function as SAM routers.

The direct addressing capability of the SAM tree results in a savings of both kinds of package switching operations, which makes SAM a very efficient multicast package switching infrastructure.

Preferably, the SAM communication infrastructure keeps specific state information in every node which participates in a SAM network. Accordingly, each node in a SAM network preferably keeps the following state:
  i. Point to Point Address of the parent node
  ii. Point to Point Address of each child node
  iii. SAM distribution lists for any of the subsets of the node's descendants In a preferred embodiment, the distribution lists are identified by a predicate field, which extends the addressing capability of the underlying point to point protocol. This extra field is utilized by the specific application which uses the SAM protocol to identify subsets of receivers of the published information. The utilization of an application specific predicate field as a network address is a unique characteristic embraced herein.

The aforementioned embodiment carries out a preferred implementation of the SAM tree utilizing subscription and notification operations which utilize the predicate field. Here, an implementation utilizing the IP protocol as the underlying point to point protocol is discussed, but it should be understood that any similar implementation utilizing any other underlying protocol will not deviate from the spirit or scope of the present invention.

Preferably, the network addresses in SAM are defined by a pair of the following format:

<source,predicate> where:
  i. The address of a source of information is itself expressed as a pair of the format [host address, port number]. The host address conforms to the addressing scheme of the underlying point to point protocol. In a sample implementation using TCP/IP this address can be given in dotted decimal format, or alternatively as a host name which can be mapped into a network address, and the port number refers to a communication port which is bound to the publisher process.
  ii. The predicate field is utilized by the subscribers to specify a predicate which is interpreted by the publisher process to select a subset of the information stream.

(Though it is feasible to implement SAM over a variety of network protocols, the present discussion will be limited to implementation based on TCP/IP.)

For example, suppose that the publisher provides an information stream including an integer series which is updated at every second. For the present discussion, this information stream may be labeled "the value of X".

Assume now that a subscriber process wants to receive the current value of X, which is published by node P1 at port 7777, but only if X is greater than 130. In SAM, it is possible to express this specific interest with the following network address:

<P1:7777,"X>130">

In another example, the values of the X series indicate unique identifiers which label data items. Therefore, the subscriber could express the desire to receive updates of an item numbered 12345, published by P1 at port 8888, utilizing the following SAM address:

<P1:8888,"X=12345">

The SAM predicate value is preferably handled as a binary value which extends the IP network address, therefore "refining" the granularity of the addressability. It is therefore possible for subscribers to utilize any value, as long as this value can be understood by the publisher of the information. The routers using the SAM protocol have no semantic understanding of the predicates; they are handled exactly as network addresses. This allows SAM to be utilized by essentially any type of publisher system, even supporting different lengths in the predicate field.

The disclosure now turns to a discussion of an implementation of the protocol discussed generally in the copending and commonly owned U.S. patent application filed concurrently herewith, "Methods And Apparatus for the Propagation Of Multicast Transmissions In A Communications Network" (application Ser. No. 09/926,928), but now in networks in which the support of specialized routers can be assumed.

Regular routers are specialized nodes in the communication network which are capable of routing messages according to the standard Internet Protocol (IP). The routing capability is provided by a process which runs in the router nodes. In the implementation proposed herebelow, the routers are specialized by the addition of a separate process capable of processing the subgroup addressing protocol. In the particular, in the implementation discussed herebelow, it is assumed that all IP router nodes in the communications network have been extended such that, in addition to standard IP routing, they also have the capability of routing messages based on the subgroup multicasting protocol (SAM). It should be noted that although the specific implementation discussed in this section is based on the IP protocol, any other implementation based on another point to point protocol does not deviate from the spirit of this invention.

Key to a successful implementation of the subgroup multicasting protocol presently contemplated is the efficient construction of the message propagation tree. In case that all IP routers are available to participate in the subgroup multicasting protocol, it is possible to obtain the optimal propagation tree, due to the fact that the actual message propagation path can be readily obtained from the routing tables of each node, as shown in the method described below. In this case, the resulting message propagation tree from a given publisher node is entirely derived from the routing topology of the IP protocol.

Figure 2:
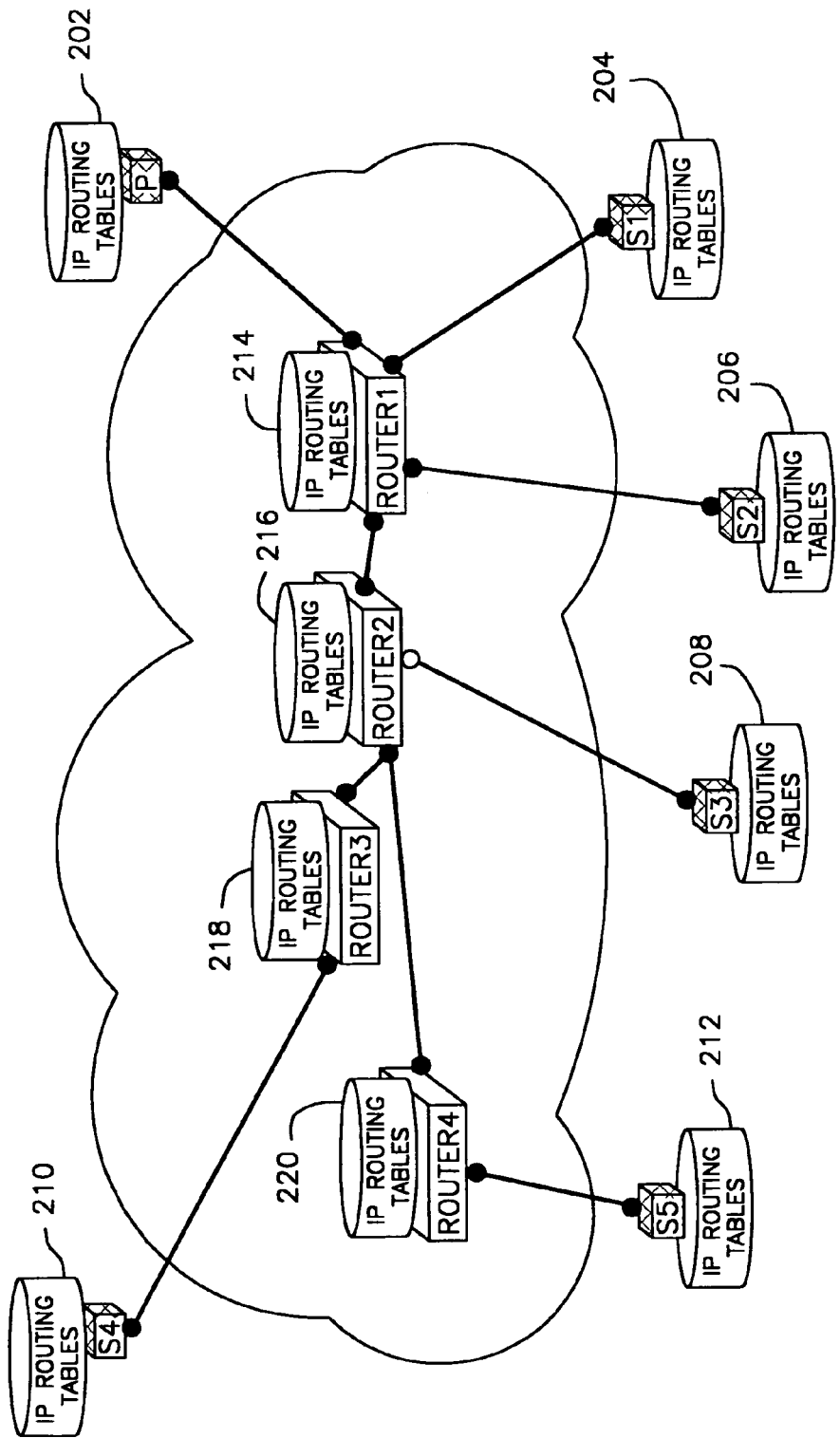
FIG. 2 schematically illustrates a standard IP network with router nodes and host nodes.
Figure 3:
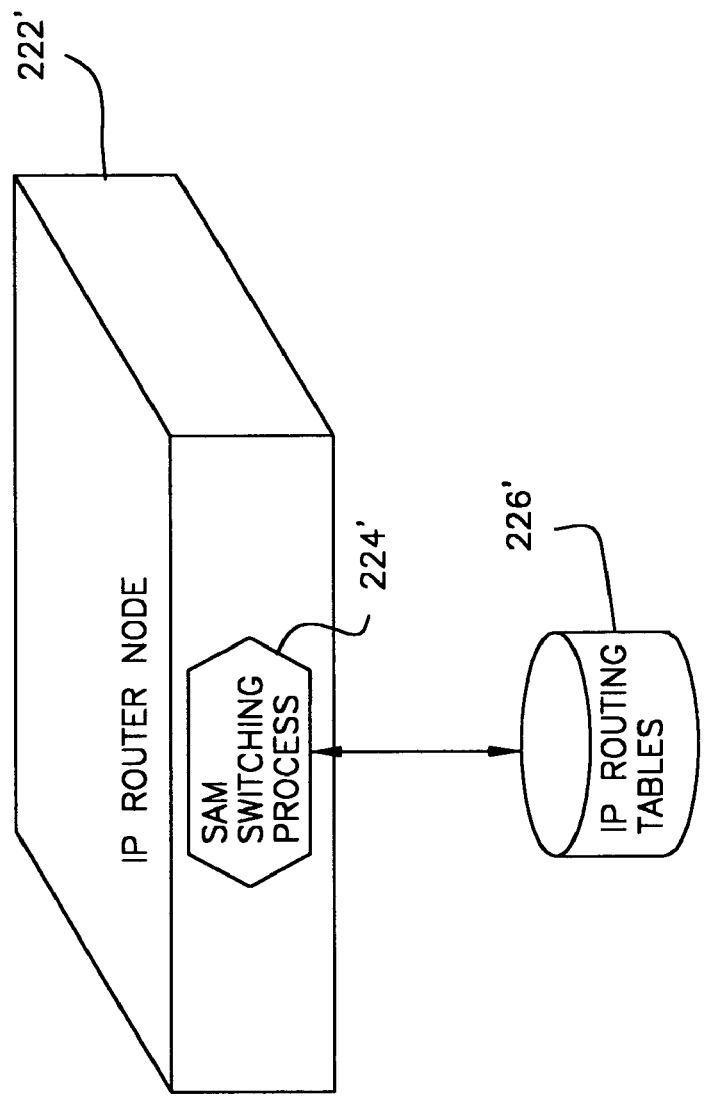
FIG. 3 is a detailed view of an arbitrary routing node from FIG. 2.

Contemplated herein is a specific realization in a homogenous network in which all router nodes that are involved in the point to point protocol routing are also capable of carrying out SAM message switching. (The switching process is described in further detail in the copending and commonly assigned U.S. patent application filed herewith, "Methods And Apparatus for the Propagation Of Multicast Transmissions In A Communications Network", supra.) This realization is preferably built as an extension of the point to point message switching which is universally supported in the network. FIGS. 2 and 3 illustrate how an existing point to point network can be extended in this realization according to an embodiment of the present invention.

FIG. 2 depicts a standard IP network, showing 4 router nodes (Router1–Router4) and 6 host nodes (S1–S5 and P). All nodes in the network store the point to point switching tables (in this case IP) in persistent storage. The host nodes each preferably consult their routing tables (202, 204, 206, 208, 210, 212) in order to determine which network connection to utilize to send messages to specific hosts. The router nodes forward such messages at each hop of the network, utilizing their own point to point routing tables (214, 216, 218, 220). In the IP protocol, a message is switched at each intermediate routing node, i.e., a routing table lookup is done and the message if forwarded to the next intermediate router node or the final destination. These tasks are preferably done by the IP switching process which is executed at the IP router node.

FIG. 3 is a detailed view of a typical IP routing node 222' from the network in FIG. 2, showing an inherent package switching process 224'. The double arrow which connects the package switching process to the corresponding IP routing tables 226' illustrates that the process can read and write to that storage.

Figure 4:
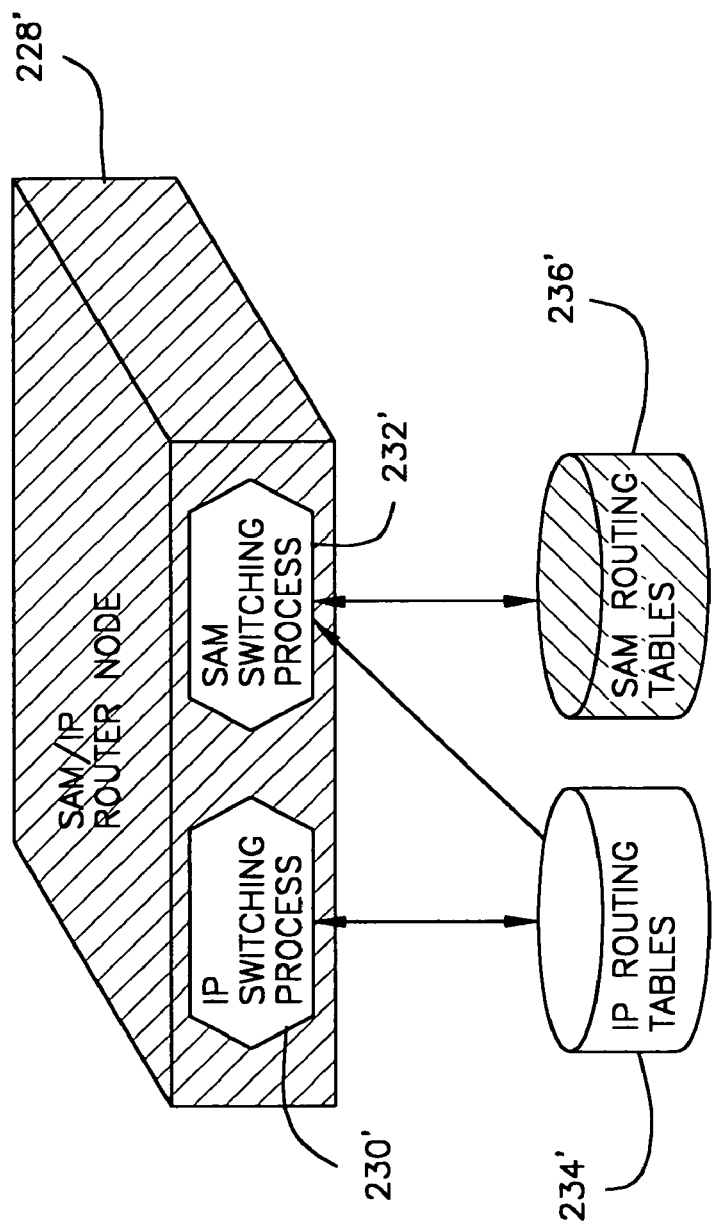
FIG. 4 is a detailed view of an arbitrary SAM/IP routing node.

In accordance with at least one presently preferred embodiment of the present invention, the implementation of SAM infrastructure effects a modification of the basic network, adding the capability of performing SAM package switching operations at every router in the network. Because the package switching operations in SAM are distinct from conventional IP switching, it is possible to add a separate process to the router dedicated to SAM message switching, as illustrated in FIG. 4. Accordingly, as shown in FIG. 4, an arbitrary SAM/IP router node 228' may include not only a standard IP switching process 230' but also a SAM switching process 232'. Preferably, the SAM switching process 232' enjoys two-way (read and write) communication with the SAM routing tables 236'. The single arrow which connects the SAM package switching process232' to the IP routing tables 234', however, denotes that the SAM switching process 232' will preferably be capable of only reading from that storage, but not writing to it.

Figure 5:
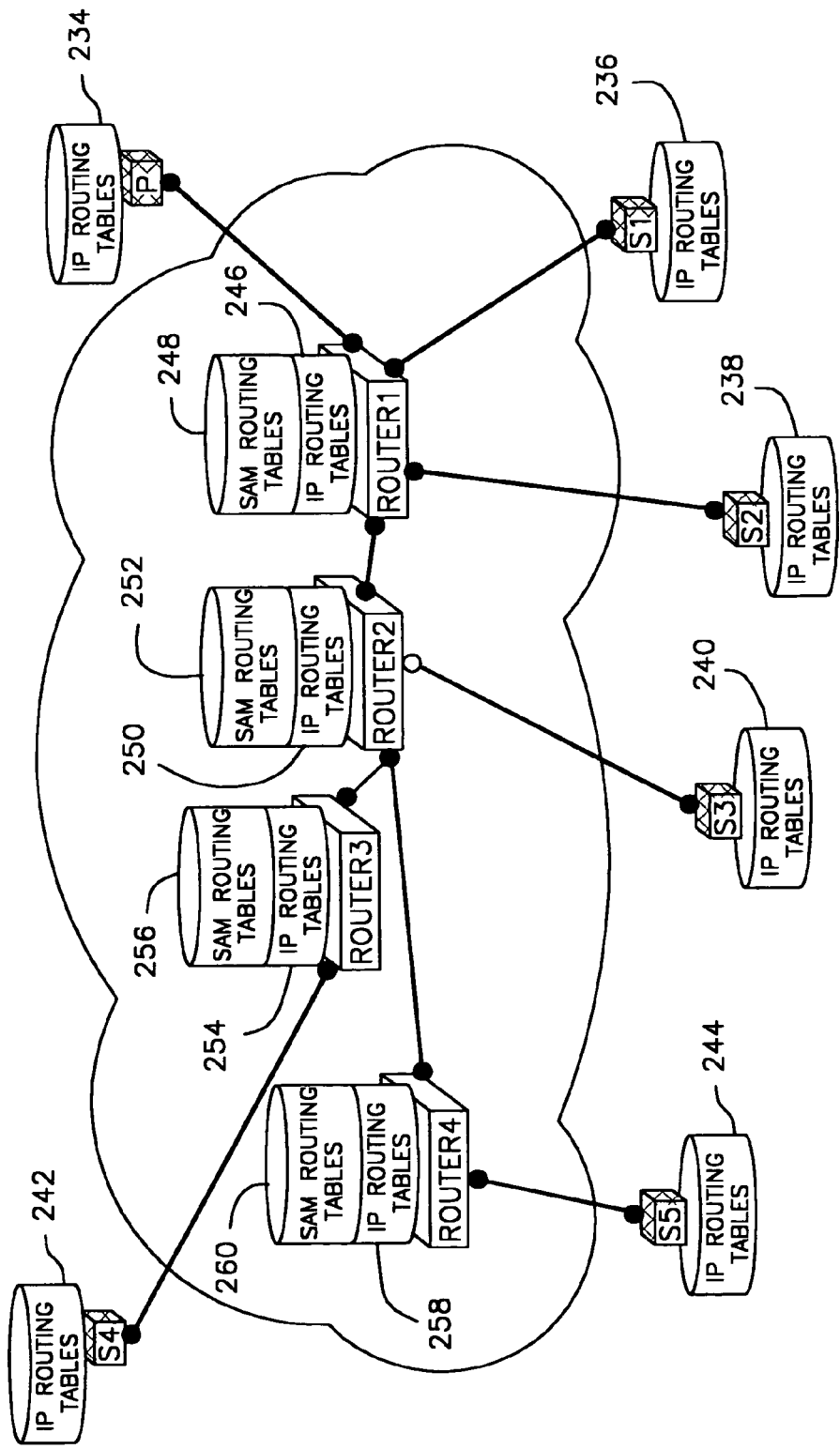
FIG. 5 schematically illustrates a modified network.

Thus, preferably, in accordance with at least one embodiment of the present invention, the tasks of basic IP switching and SAM switching are divided between the two routing processes. Therefore, the SAM routing processes in one node depends on the basic point to point switching process in order to communicate to the SAM process in another node, even if both nodes are neighbors in the network. The SAM routing process utilizes a separate message port to send and receive messages. FIG. 5 depicts a modified network, with the addition of SAM routing tables 248, 252, 256 and 260 and SAM switching logic to each router node (Router1–Router4) in the network. (The SAM switching logic is not specifically shown in FIG. 5 but should be understood to be inherent in each router node). Also shown are standard IP routing tables 234, 236, 238, 240, 242, 244, 246, 250, 254 and 258, essentially analogous to those shown in FIG. 2.

Figure 6:
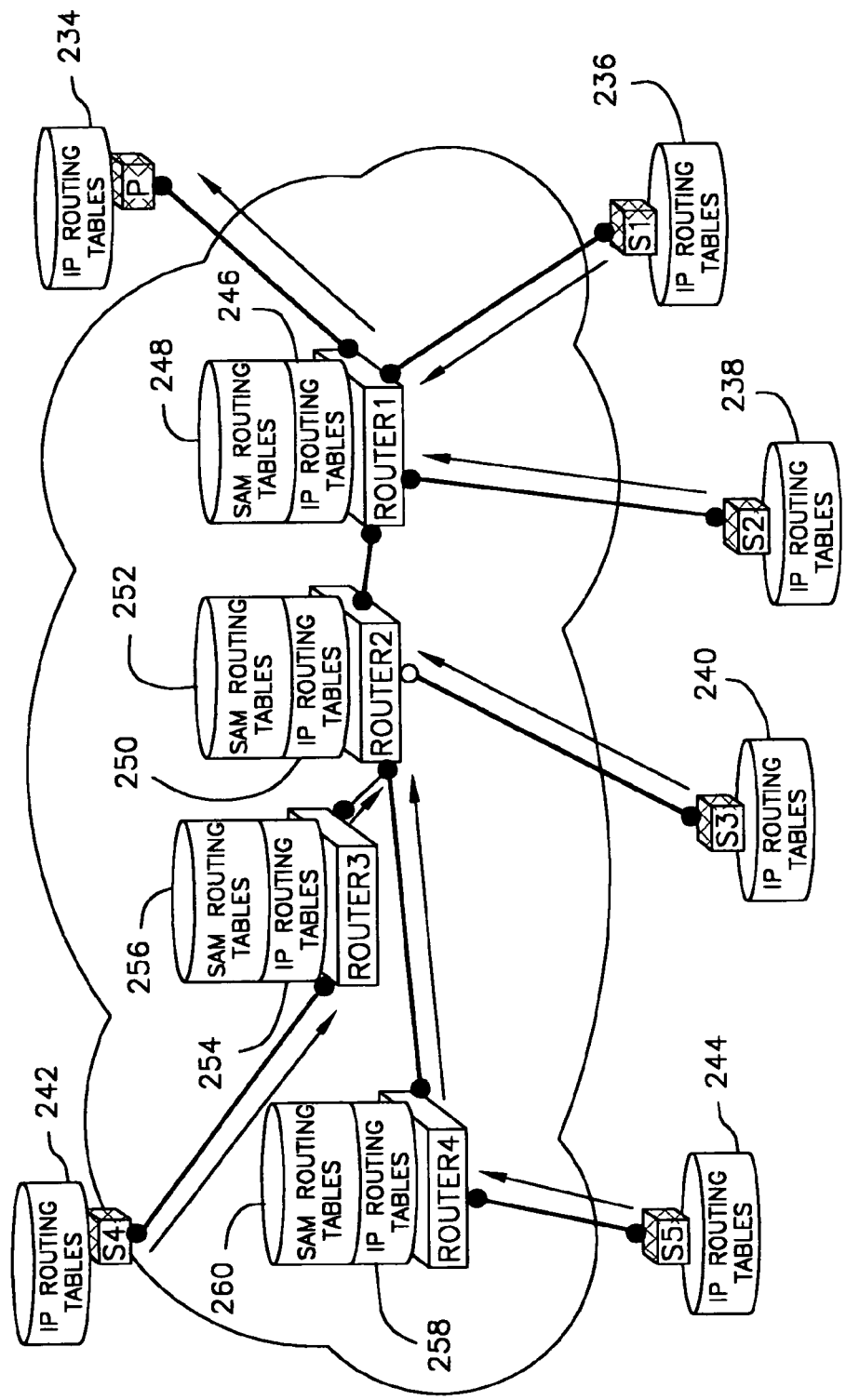
FIG. 6 is essentially the same view as FIG. 5, but illustrating the propagation of messages.

In connection with propagating bottom-up messages, SAM package switching nodes preferably do a lookup in the IP routing tables in order to determine where to forward the SAM messages which are propagated from the bottom of the SAM tree toward parent nodes. There are three kinds of messages in SAM which are propagated from the leaf nodes toward the root of the SAM tree: subscription, unsubscription and substitution messages. The SAM processes make a lookup of the IP routing table and utilize the same logic as the underlying point to point IP protocol in order to determine the address of the next node to which the SAM package should be routed. FIG. 6 shows the propagation path of these messages in the sample network from FIG. 5.

Figure 7:
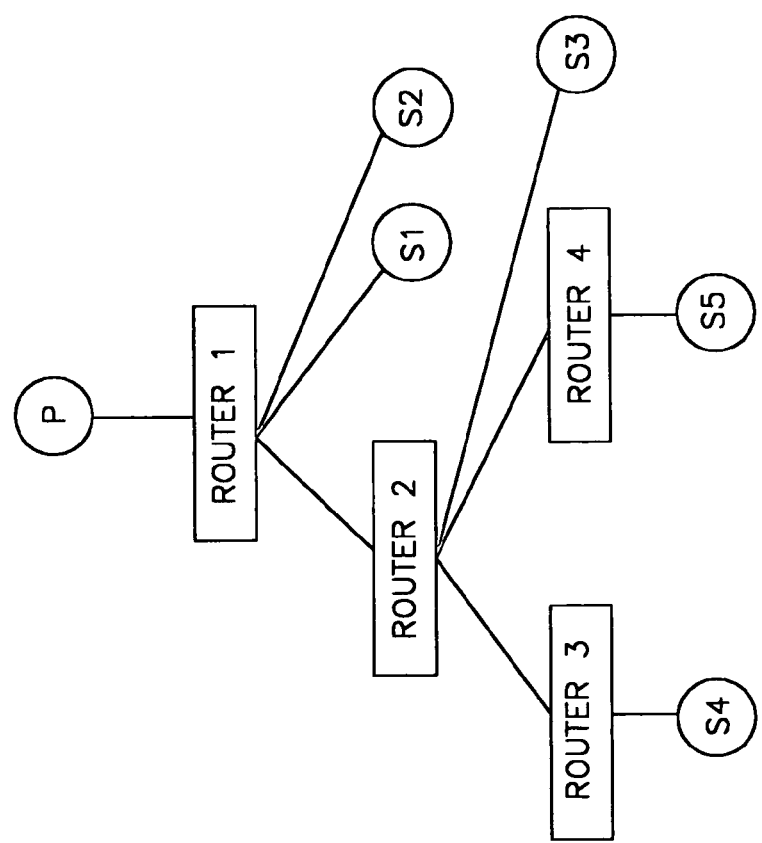
FIG. 7 schematically illustrates a SAM tree.

The direct utilization of the IP routing tables by the SAM processes as illustrated in FIG. 6 forces the propagation path of the SAM bottom-up messages to coincide with the propagation path of the IP messages in the network. Therefore, the SAM tree will coincide with a bottom-up IP propagation pattern of the SAM messages. This is illustrated by the SAM tree in FIG. 7, which is derived directly from the IP routing information of each node, considering that the node P was the final IP destination of the bottom-up messages.

It should be noted that, here, the bottom up messages are switched by the SAM routing process at each intermediate node. Also, any point to point should preferably be routed by an IP switching process. Since SAM itself utilizes the point to point protocol, any message from a SAM switching process is first necessarily routed to the IP switching process which is collocated in the same node.

Figure 8:
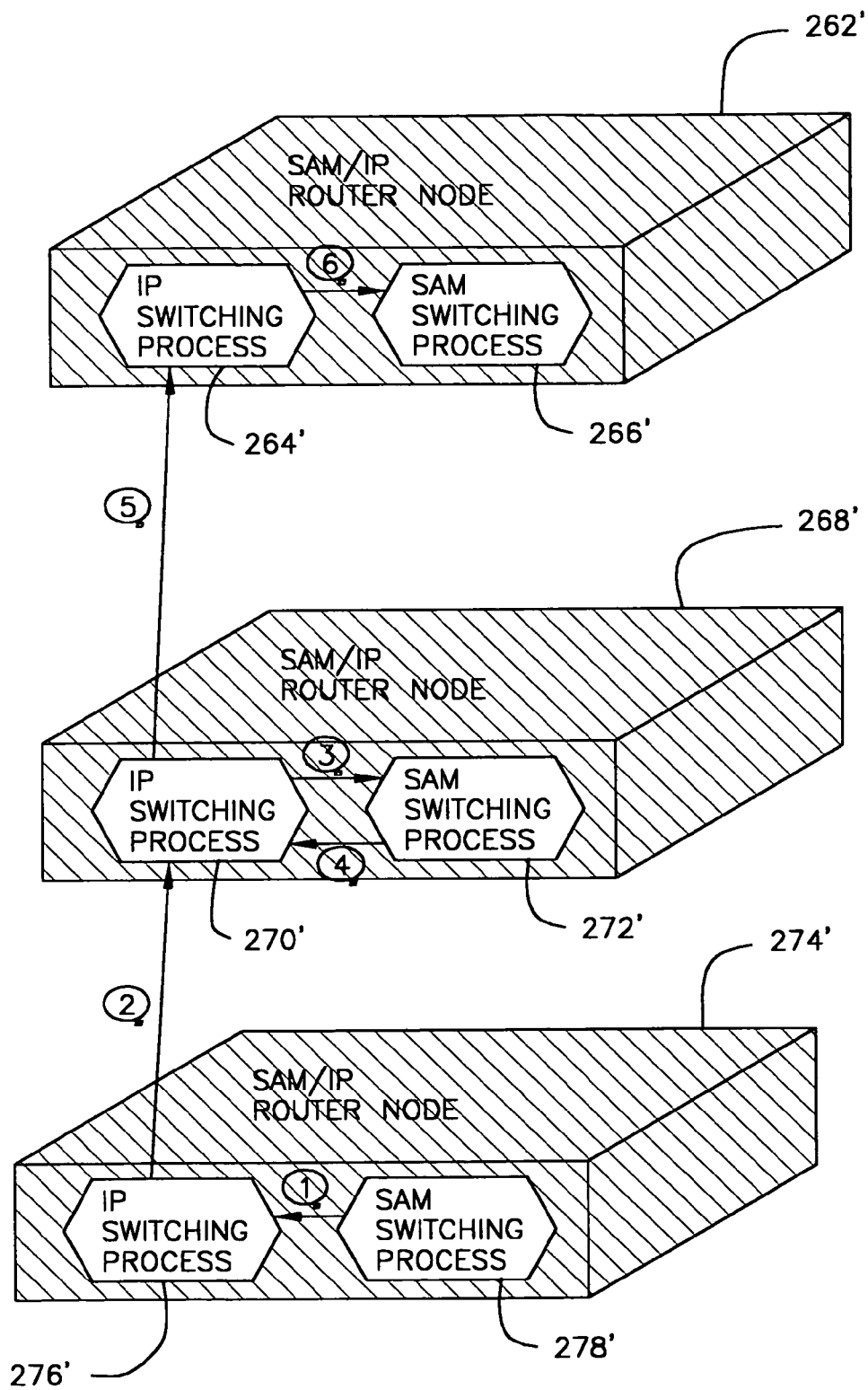
FIG. 8 depicts a detailed message flow for bottom up messages.

FIG. 8 depicts a detailed message flow for bottom up SAM messages. Particularly, the bubbled numerals 1-6 illustrate various sequenced steps in such a message flow. Thus, for arbitrary SAM router nodes 262', 268' and 274' which each include, respectively, an IP switching process and SAM switching process 264'/266', 270'/272' and 276'/278', and wherein node 274' is the lowest router node in the hierarchy of the three depicted nodes, followed by 268' and 262', a message will preferably propagate from SAM switching process 278' to IP switching process 276' (bubble 1), thence to IP switching process 270' (bubble 2), thence to SAM switching process 272' (bubble 3), thence back to IP switching process 270' (bubble 4), thence to IP switching process 264' (bubble 5) and thence to SAM switching process 266' (bubble 6).

Figure 9:
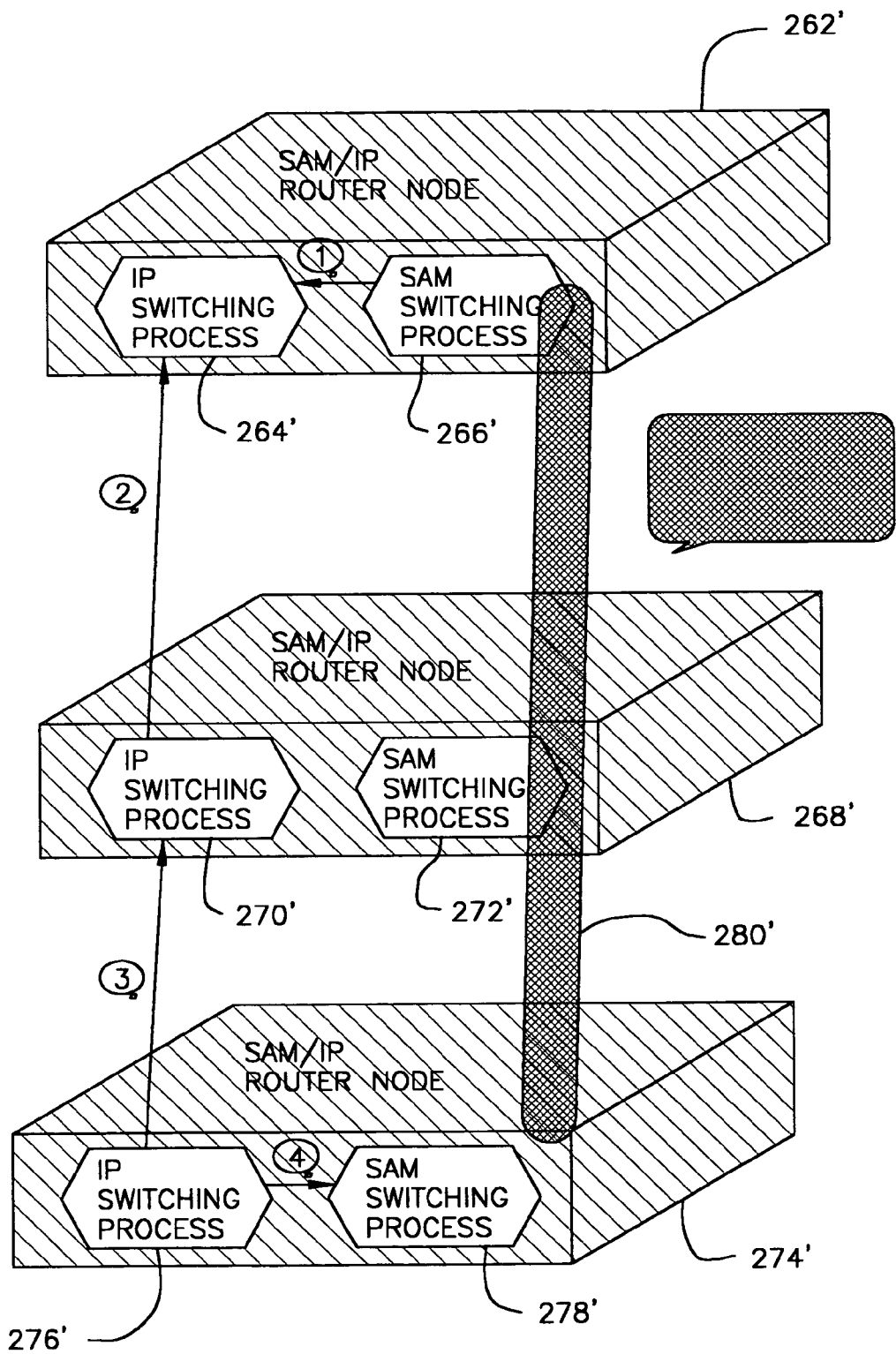
FIG. 9 depicts a detailed message flow for top down messages.

In accordance with an embodiment of the present invention, in contrast with the propagation pattern described above for the bottom up messages, and as shown in FIG. 9, notification messages preferably follow a distinct top down pattern. In this pattern, the SAM package switching nodes address the notification messages to nodes which are not network neighbors in the underlying point to point network. This is possible because the SAM switching process is independent from the IP switching process in this implementation. The utilization of a network address of a node which is not a direct network neighbor creates an effect known as protocol tunneling. The direct utilization of point to point addresses at each step of the notification message switching process previously described (and as described in detail in "Methods And Apparatus for the Propagation Of Multicast Transmissions In A Communications Network" (application Ser. No. 09/926,928), supra) creates what is equivalent to a protocol tunnel as illustrated in FIG. 9. (It should be noted that the protocol tunneling effect is also represented by the dotted lines in FIG. 1.) It should be noted that the SAM package switching process in the intermediate node shown in FIG. 9 is not involved in the message transport from the top node to the bottom node.

Accordingly, FIG. 9 is essentially similar to FIG. 8 but shows top-down message propagation. As shown, the message originates at SAM switching process 266' of "highermost" node 262', thence progresses to IP switching process 264' (bubble 1), thence to IP switching process 270' (bubble 2), thence to IP switching process 276' (bubble 3), and thence to SAM switching process 278' (bubble 4). Since the SAM switching process 272' in the intermediate node 268' does not participate in the forwarding process of the notification message, the node is said to be "tunneled through", resulting in an effective protocol tunnel 280' interconnecting the higherost and lowermost nodes 262', 274'. This technique is important because the message switching system is made much more efficient, given that there are fewer switching operations involved. In this simple example, the number of retransmissions was reduced to 4, from the original 6. In a large network, there will be many intermediate nodes, and the savings made possible by the utilization of the tunneling feature are very significant.

Figure 10:
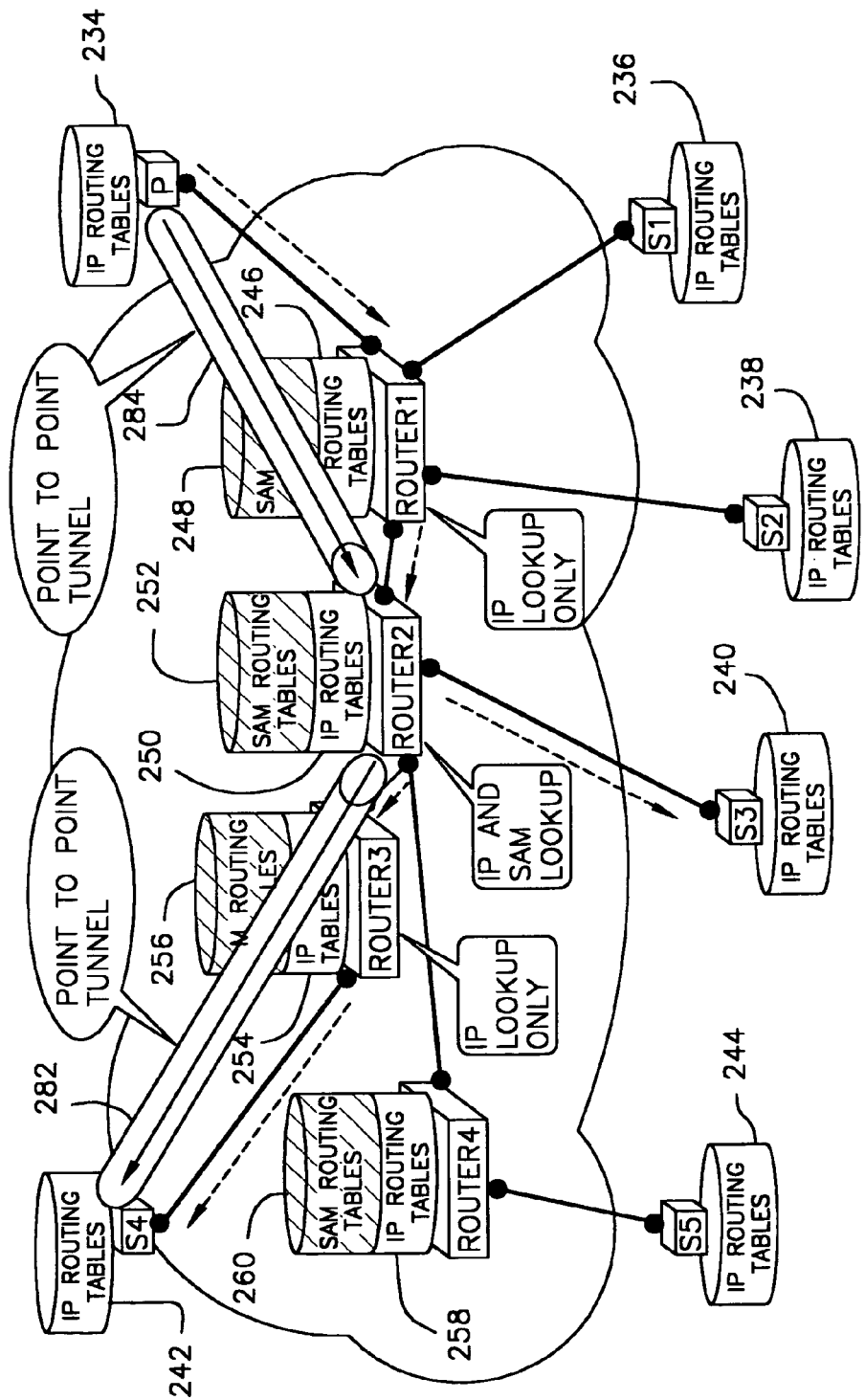
FIG. 10 is essentially the same view as FIGS. 5 and 6, but illustrating a different propagation of messages than in FIG. 6.

Since SAM utilizes direct point to point addresses to nodes which are not network neighbors at each hop of the propagation of the notification messages, there are potential gains at portion of the notification message path. FIG. 10, essentially similar to FIGS. 5 and 6 in terms of basic layout, shows effective protocol tunnels 282, 284 utilized in the propagation of notification messages from publisher node P to subscribers S3 and S4. The first tunnel 284 utilizes the address of router2, which is a fork node in the SAM tree for messages directed at both S3 and S4. Another tunnel 282 is utilized between router2 and S3, skipping the SAM switching operation in router3. The dotted arrows indicate the actual path taken by the IP routing operations.

It is to be understood that the present invention, in accordance with at least one presently preferred embodiment, includes an arrangement for designating a node as a publisher node; an arrangement for designating at least one node as a subscriber node; and at least one router node, wherein each router node comprises: a first switching arrangement being adapted to route a message between the publisher node and the subscriber node in accordance with a first protocol, and a second switching arrangement being adapted to route a message between the publisher node and the subscriber node in accordance with a second protocol. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of facilitating multicast communication among at least two nodes in a distributed network configured for point to point communications, said method comprising the steps of:
   designating no more than one of the nodes as a publisher node;
   designating at least one of the nodes as a subscriber node; and
   designating at least one of the subscriber nodes as a router node;
   providing each router node with a first switching arrangement, the first switching arrangement connected to route a message between said publisher node and said subscriber node in accordance with a first protocol; and
   providing each router node with a second switching arrangement, the second switching arrangement connected to route a message between said publisher node and said subscriber node in accordance with a second protocol;
   wherein the two protocols utilize distinct addressing schemes, and further, at least one of the addressing schemes utilizes a subsource addressing multicast protocol including an application specific predicate field related to a network address.

2. The method according to claim 1, wherein:
   said step of providing a first switching arrangement comprises providing a first set of at least one routing cable; and
   said step of providing a second switching arrangement comprises providing a second set of at least one routing table.

3. The method according to claim 2, wherein said step of providing a second set of at least one routing table comprises providing at least one subsource addressing multicast routing table.

4. The method according to claim 2, wherein said step of providing a first set of at least one routing table comprises providing at least one point to point protocol routing table.

5. The method according to claim 4, wherein said step of providing at least one point to point protocol routing table comprises providing an IP routing table.

6. The method according to claim 1, further comprising the steps of:
   propagating a message from said subscriber node to said publisher node using the second protocol;

said propagating step comprising propagating the message hop-by-hop via at least one router node.

7. The method according to claim 1, further comprising the steps of:
propagating a message from said publisher node to said subscriber node using the second protocol;
said propagating step comprising propagating the message directly to at least one router node via protocol tunnelling.

8. The method according to claim 1, wherein the first protocol comprises a native point to point protocol of the network.

9. An apparatus for facilitating multicast communication among at least two nodes in a distributed network, said apparatus comprising:
an arrangement for designating no more than one of the nodes as a publisher node;
an arrangement for designating at least one of the nodes as a subscriber node; and
an arrangement for designating at least one of the subscriber nodes as a router node, wherein each router node comprises:
a first switching arrangement connected to route a message between said publisher node and said subscriber node in accordance with a first protocol; and
a second switching arrangement connected to route a message between said publisher node and said subscriber node in accordance with a second protocol,
wherein the two protocols utilize distinct addressing schemes, and further, at least one of the addressing schemes utilizes a subsource addressing multicast protocol including an application specific predicate field related to a network address.

10. The apparatus according to claim 9, wherein:
said first switching arrangement comprises a first set of at least one routing table; and
said second switching arrangement comprises a second set of at least one routing table.

11. The apparatus according to claim 10, wherein said second set of at least one routing table comprises at least one subsource addressing multicast routing table.

12. The apparatus according to claim 10, wherein said first set of at least one routing table comprises at least one point to point routing table.

13. The apparatus according to claim 12, wherein said at least one point to point routing table comprises at least one IP routing table.

14. The apparatus according to claim 9, further comprising:
an arrangement for propagating a message from said subscriber node to said publisher node using the second protocol;
said propagating arrangement being adapted to propagate the message hop-by-hop via at least one router node.

15. The apparatus according to claim 9, further comprising:
an arrangement for propagating a message from said publisher node to said subscriber node using the second protocol;
said propagating arrangement being adapted to propagate the message directly to at least one router node via protocol tunnelling.

16. The apparatus according to claim 9, wherein said first protocol comprises a native point to point protocol of the network.

17. A computer program storage device readable by a computer, tangibly embodying a computer program of instructions executable by a processor to perform the method steps for facilitating multicast communication among at least two nodes in a distributed network, said method comprising the steps of:
designating no more than one of the nodes as a publisher node;
designating at least one of the nodes as a subscriber node; and
designating at least one of the subscriber nodes as a router node;
providing each router node with a first switching arrangement, the first switching arrangement connected to route a message between said publisher node and said subscriber node in accordance with a first protocol; and
providing each router node with a second switching arrangement, the second switching arrangement connected to route a message between said publisher node and said subscriber node in accordance with a second protocol,
wherein the two protocols utilize distinct addressing schemes, and further, at least one of the addressing schemes utilizes a subsource addressing multicast protocol including an application specific predicate field related to a network address.

* * * * *